United States Patent
Kim

(10) Patent No.: US 9,583,972 B2
(45) Date of Patent: *Feb. 28, 2017

(54) APPARATUS AND METHOD FOR REDUCING POWER CONSUMPTION OF ELECTRONIC PRODUCT

(71) Applicant: Chang-Ho Kim, Seoul (KR)

(72) Inventor: Chang-Ho Kim, Seoul (KR)

(*) Notice: Subject to any disclaimer, the term of this patent is extended or adjusted under 35 U.S.C. 154(b) by 860 days.

This patent is subject to a terminal disclaimer.

(21) Appl. No.: 13/930,198

(22) Filed: Jun. 28, 2013

(65) Prior Publication Data

US 2013/0285473 A1    Oct. 31, 2013

Related U.S. Application Data

(63) Continuation of application No. 12/759,917, filed on Apr. 14, 2010, now Pat. No. 8,476,791.

(30) Foreign Application Priority Data

Jun. 19, 2009 (KR) .......... 10-2009-0054754
Jul. 27, 2009 (KR) .......... 10-2009-0068440

(51) Int. Cl.
*H02J 9/00* (2006.01)
*F25D 29/00* (2006.01)

(52) U.S. Cl.
CPC .......... *H02J 9/005* (2013.01); *F25D 29/00* (2013.01); *Y10T 307/766* (2015.04); *Y10T 307/826* (2015.04); *Y10T 307/944* (2015.04)

(58) Field of Classification Search
CPC ...... H02J 9/005; F25D 29/00; Y10T 307/766; Y10T 307/826; Y10T 307/944

USPC .......................................................... 307/116
See application file for complete search history.

(56) References Cited

U.S. PATENT DOCUMENTS

| 2009/0082909 | A1 | 3/2009 | Sakane | |
|---|---|---|---|---|
| 2009/0102294 | A1 | 4/2009 | Hodges et al. | |
| 2010/0019583 | A1* | 1/2010 | DuBose | G06F 1/26 307/126 |

FOREIGN PATENT DOCUMENTS

| JP | 2000-111675 A | 4/2000 |
|---|---|---|
| JP | 2000-270472 A | 9/2000 |
| JP | 2002-146878 A | 5/2002 |
| JP | 2002-186178 A | 6/2002 |
| JP | 2008-167629 A | 7/2008 |
| JP | 2009-081948 A | 4/2009 |

* cited by examiner

Primary Examiner — Rexford Barnie
Assistant Examiner — Toan Vu
(74) Attorney, Agent, or Firm — Cha & Reiter, LLC

(57) ABSTRACT

Provided is an apparatus and method for reducing power consumption of an electronic product. The apparatus and method reduces unnecessary power consumption by cutting off power for driving a load if a predetermined control condition is satisfied in an electronic product operating for a long time. In the electronic product operating for a long time, power for driving the load is cut off to prevent waste of the power if the predetermined control condition is satisfied, and the load is driven only when the predetermined control condition is not satisfied, thereby efficiently reducing the power consumption of the electronic product.

6 Claims, 2 Drawing Sheets

APPARATUS AND METHOD FOR REDUCING POWER CONSUMPTION OF ELECTRONIC PRODUCT

CROSS RELATED APPLICATION

The present application is a Continuation of U.S. patent application Ser. No. 12/759,917 filed on Apr. 14, 2010 which claims the benefit under 35 U.S.C. §119(a) of an application entitled "Apparatus and Method For Reducing Power Consumption of Electronic Product" filed in the Korean Intellectual Property Office and assigned Serial No. 10-2009-0054754 filed in the Korean Intellectual Property Office on Jun. 19, 2009, and an application entitled "Apparatus and Method For Reducing Power Consumption of Electronic Product" filed in the Korean Intellectual Property Office and assigned Serial No. 10-2009-0068440 filed in the Korean Intellectual Property Office on Jul. 27, 2009, the entire disclosures of which are hereby incorporated by reference.

BACKGROUND OF THE INVENTION

1. Field of the Invention

The present invention relates to an apparatus and method for reducing power consumption of an electronic product, and more particularly, to an apparatus and method in which if a predetermined control condition is satisfied in an electronic product operating for a long time, power for actuating the electronic product is cut off to reduce unnecessary power consumption of the electronic product.

2. Description of the Related Art

In an electronic product operating for a long time, a load for exhibiting a unique function of the electronic product does not operate at all times. Instead, the load is temporarily suspended if a predetermined control condition (temperature, heat, pressure, or the like) is satisfied; otherwise, the load resumes operating.

Conventional electronic products are continuously supplied with power even if a predetermined control condition is satisfied. That is, even when power supply is not necessary for driving the load because the predetermined control condition is satisfied, the power is continuously supplied. As a result, unnecessary power consumption occurs in the electronic product due to standby power generated in the electronic product.

For example, in a refrigerator, a compressor operates to maintain a temperature preset by a user. If the internal temperature of the refrigerator reaches the preset temperature, the compressor temporarily stops operating. If the internal temperature of the refrigerator increases over the preset temperature, the compressor resumes operating. Even when the compressor stops operating, the power is still supplied to the refrigerator, causing power consumption. In spite of variation with a user's use pattern, the compressor usually operates for 5 hours per day in average for household usage. Consequently, in the refrigerator, unnecessary power consumption occurs for 19 hours per day in average.

Other electronic products operating for a long time also unnecessarily consume power due to standby power even when a load does not operate like in the refrigerator.

For example, in spite of different types of loads such as a heater, a pump, a solenoid valve, a fan, a lamp, and the like, modems, facsimiles, set-top boxes, copy machines, water coolers/water heaters, microwave ovens, bidets, thermoregulators, machine tools, boilers, hand dryers, and other electronic products suffer from the same problem, unnecessary power consumption, even when the load does not operate.

Accordingly, to solve the foregoing problem, there is an urgent need for an apparatus and method for reducing power consumption of an electronic product.

SUMMARY OF THE INVENTION

An aspect of the present invention is to address at least the above problems and/or disadvantages and to provide at least the advantages described below. Accordingly, an aspect of the present invention is to provide an apparatus and method for efficiently reducing power consumption of an electronic product, in which power consumption is prevented by cutting off power for driving a load if a predetermined control condition is satisfied, and the power is supplied to drive the load if the predetermined control condition is not satisfied.

According to an aspect of the present invention, there is provided an apparatus for reducing power consumed in an electronic product operating for a long time, the apparatus including a power switching unit for supplying or cutting off external power to the electronic product, a sensor unit for measuring a state associated with an operation of a load of the electronic product and outputting measured data, and a controller for determining whether the electronic product satisfies a predetermined control condition by using the measured data output from the sensor unit and controlling the power switching unit and the load of the electronic product according to the determination result, in which if the electronic product satisfies the predetermined control condition, the controller stops the operation of the load and turns off the power switching unit to cut off the external power; otherwise, if the electronic product does not satisfy the predetermined control condition, the controller turns on the power switching unit to supply the external power and drives the load again.

According to another aspect of the present invention, there is provided a method for reducing power consumed in an electronic product operating for a long time, the method comprising measuring, by a sensor unit, a state associated with an operation of a load of the electronic product and outputting measured data; determining, by a controller, whether a predetermined control condition is satisfied by using the output measured data; if the predetermined control condition is satisfied, stopping, by the controller, the operation of the load and turning off a power switching unit to cut off the external power; and if the predetermined control condition is not satisfied, turning on, by the controller, the power switching unit to supply the external power and driving the load again.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

In the following description of the present invention, a detailed description of known functions and configurations incorporated herein is omitted to avoid making the subject matter of the present invention unclear. Terms hereunder are defined on the basis of the function in the present invention, and may vary in accordance with users' or operators' intention, usual practices, and so on. Therefore, the definition of the terms should be made based on the whole contents of the specification.

The present invention proposes an apparatus and method for reducing power consumption of an electronic product operating for a long time. In an electronic product operating for a long time, a load for exhibiting a unique function of the electronic product does not operate at all times. Instead, the load is temporarily suspended if a predetermined control condition (temperature, heat, pressure, and so forth) is satisfied; otherwise, the load resumes operating.

For example, in a refrigerator, a compressor operates to maintain a temperature preset by a user. If the internal temperature of the refrigerator reaches the preset temperature, the compressor temporarily stops operating. In the present invention, when a predetermined control condition is satisfied in an electronic product and thus a load is temporarily suspended, power supplied to the electronic product is cut off to reduce power consumed in the electronic product.

In the following embodiment of the present invention, a state where the load is suspended, that is, a voltage is not provided into the electronic product, will be referred to as a power cut-off mode and a state where the load operates, that is, a voltage is provided into the electronic product, will be referred to as a power supply mode. In the power cut-off mode, a controller is not awake at all times and periodically wakes up. A state where the controller operates will be referred to as a wake-up mode and a state where the controller does not operate will be referred to as a sleep mode.

The present invention cuts off power supply to the electronic product when the electronic product is in the power cut-off mode, that is, a load does not operate, thereby reducing unnecessary standby power consumed in the electronic product.

Hereinafter, an exemplary embodiment of the present invention will be described in detail with reference to the accompanying drawings. A description will now be made of the structure and operations of the apparatus for reducing power consumption of the electronic product.

Figure 1:
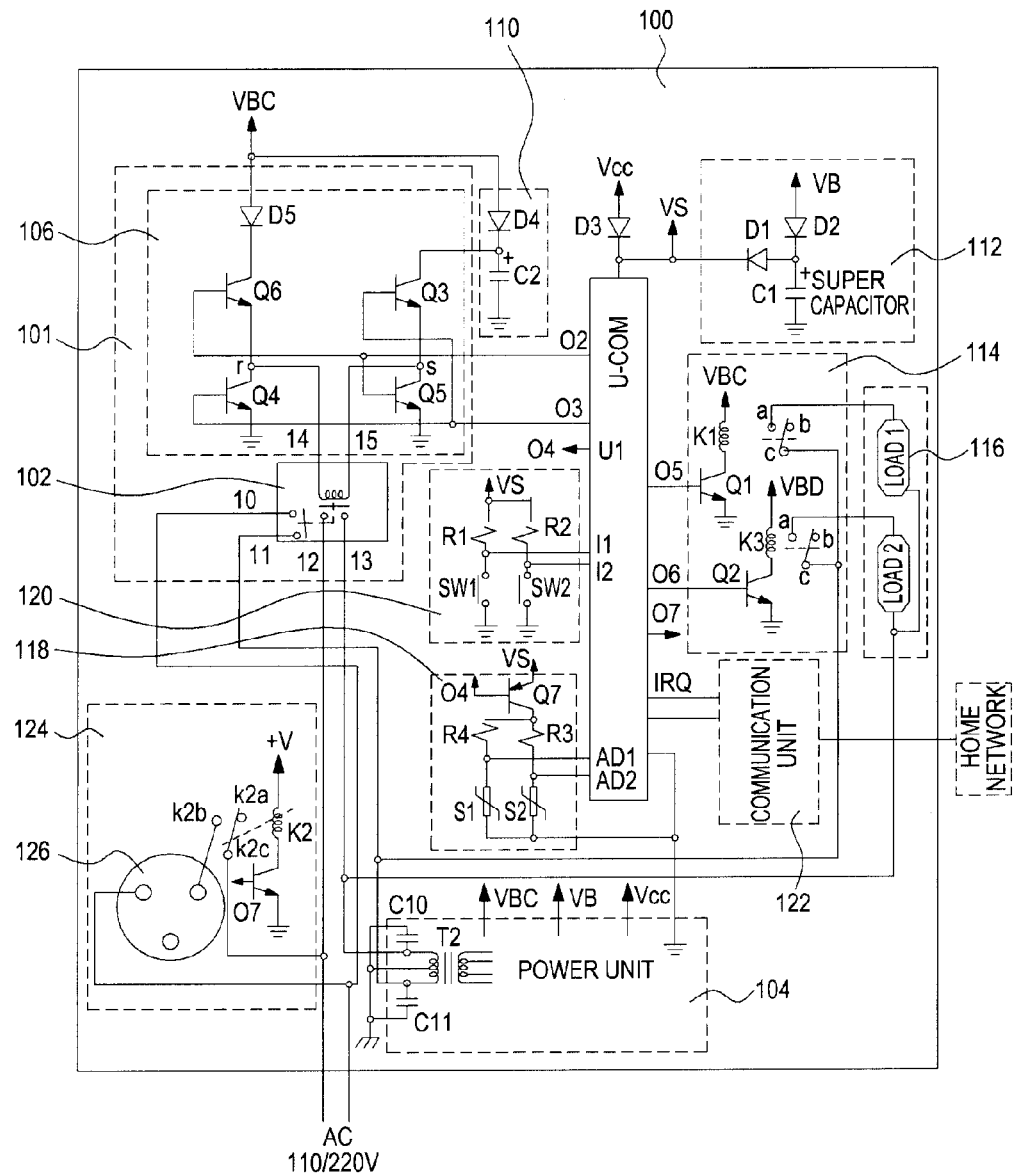
FIG. 1 is a circuit diagram of an apparatus for reducing power consumption of an electronic product according to an embodiment of the present invention.

FIG. 1 is a circuit diagram of an apparatus for reducing power consumption of an electronic product according to an embodiment of the present invention.

Referring to FIG. 1, an electronic product 100 includes a power switching unit 101, a latching relay 102, a power unit 104, a latching relay driving unit 106, a controller 108, a latching relay power unit 110, a sleep-mode power unit 112, a load driver 114, loads 116 (or loads 1 and 2), a sensor unit 118, a key input unit 120, a communication unit 122, an outlet portion 124, and an outlet 126. In the following description, operations of components which are not related to the present invention will not be described.

The power unit 104 converts alternating current (AC) power input from an external power source into direct current (DC) power and supplies the DC power into the electronic product 100. The latching relay 102 and the latching relay driving unit 106 are examples of the power switching unit 101 configured to supply or cut off power to the electronic product 100. In the following description, the latching relay 102 and the latching relay driving unit 106 will be used as examples of the power switching unit 101, but it would be obvious to those of ordinary skill in the art that other types of switches may also be used in the electronic product 100 according to the present invention. Accordingly, the latching relay power unit 110 is an example of a power switching power unit.

The latching relay 102 closes or opens contact points 10 and 11 and contact points 12 and 13 of AC power cables going into the power unit 104, thereby supplying or cutting off power to the power unit 104. The latching relay driving unit 106, configured with four transistors Q3, Q4, Q5, and Q6 as a bridge circuit, drives the latching relay 102 under the control of the controller 108. An output O2 of the controller 108 is connected with the transistors Q5 and Q6 of the latching relay driving unit 106 and an output O3 of the controller 108 is connected with the transistors Q3 and Q4 of the latching relay driving unit 106.

The latching relay power unit 110 includes a capacitor C2 charged with current for turning 'on' the latching relay 102 and a diode D4 for preventing the charged current from being discharged. In the power cut-off mode, the latching relay power unit 110 supplies power for actuating the latching relay 102 to re-supply power into the electronic product 100. In the power cut-off mode, if the sleep-mode power unit 112 is completely discharged, the controller 108 may malfunction, and therefore, the sleep-mode power unit 112 has to be re-charged before being completely discharged. The latching relay power unit 110 actuates the latching relay 102 to supply power for re-charging the sleep-mode power unit 112.

The load driver 114 including transistors Q1 and Q2 and relays K1 and K2 drives loads 116 in the electronic product 100. The loads 116 are devices and parts which exhibit a unique function of the electronic product 100. For example, the load may be a compressor for maintaining refrigerating and freezing temperatures for a refrigerator and may be a heater for a water heater. Although the electronic product 100 shown in FIG. 1 includes two loads, it may include one or more loads as is obvious to those of ordinary skill in the art.

The sleep-mode power unit 112 includes a super capacitor C1 and diodes D1 and D2, and supplies power to some components of the electronic product 100 in the power cut-off mode. If the electronic product 100 transits to the power supply mode, the sleep-mode power unit 112 re-charges the super capacitor C1 with current. The diode D1 functions to prevent the charged current from being discharged.

When the electronic product 100 is in the power cut-off mode, main power supplied to the electronic product 100 is cut off, and thus the sleep-mode power unit 112 supplies power to the controller 108, the key input unit 120, and the communication unit 122. The controller 108 is not awake at all times, but periodically wakes up. In other words, the controller 108 periodically repeats executing the sleep mode and the wake-up mode.

The sensor unit 118 includes a transistor Q7, resistors R3 and R4, and sensors 1 and 2. The sensors 1 and 2 sense a current state corresponding to a function of the electronic product 100 and provide the sensed information to analog-to-digital converters in the controller 108. The transistor Q7 of the sensor unit 118 is connected with an output O4 of the controller 108 and the controller 108 controls the sensor unit 108 to be supplied with power from the sleep-mode power unit 112 during a sensing operation.

The key input unit 120 includes resistors R1 and R2 and switches SW1 and SW2, and is connected with inputs I1 and I2 of the controller 108. The key input unit 120 performs interrupt processing on an external input. That is, if an external input is generated in the power cut-off mode, the key input unit 120 makes a transition to the power supply mode. For example, if a user opens the door of a refrigerator being in the power cut-off mode, an interrupt is generated and a transition is made to the wake-up mode and the power supply mode, thereby re-supplying power to the refrigerator.

When the electronic product 100 is in the power cut-off mode, the communication unit 122 may receive a control signal from a home network system. Upon input of the control signal, the communication unit 122 provides the control signal to the controller 108 for interrupt processing. The controller 108 transits from the power cut-off mode to the power supply mode and performs an operation for re-supplying the power. Hereinafter, in an embodiment of the present invention, a device for generating an interrupt signal being input to the controller 108 to allow the electronic product 100 to transit to the power supply mode will be referred to as a signal generator. That is, the key input unit 120 for generating the interrupt signal and a home network may be examples of the signal generator.

The controller 108 controls an overall operation of the electronic product 100 and performs functions such as measurement, calculation, determination, memorization, and processing to control the electronic product 100 according to the characteristics of the electronic product 100. The controller 108 periodically repeats executing the sleep mode and the wake-up mode, thereby minimizing power consumed in the electronic product 100. In an embodiment of the present invention, a microcomputer (Micom) U1 may be used as an example of the controller 108.

Hereinafter, a detailed description will be made of operations of an apparatus for reducing power consumption of an electronic product according to an embodiment of the present invention.

At the time of product release, the contact points 10 and 11 and the contact points 12 and 13 of the latching relay 102 are configured to be in contact with each other to supply power to the electronic product 100 when the electronic product 100 is plugged in. If the AC power is supplied to the power unit 104 later, the power unit 104 converts the AC power into the DC power and supplies the DC power to the electronic product 100. In the power supply mode, the electronic product 100 performs a normal operation by driving the loads 116 through the load driver 114.

Once the DC power is supplied to the latching relay power unit 110 from the power unit 104, the capacitor C2 of the latching relay power unit 110 is charged with current through the diode D4. The diode D4 of the latching relay power unit 110 is inversely biased to prevent the current charged in the latching relay power unit 110 from being discharged. When the electronic product 100 transits from the power cut-off mode to the power supply mode, the latching relay power unit 110 provides the current charged in the latching relay 102. As the capacity of the capacitor C2 of the latching relay power unit 110 increases, a discharge time also increases. Therefore, an appropriate capacity may be selected based on the characteristics of the electronic product 100.

Once the DC power is supplied from the power unit 104 to the sleep-mode power unit 112, the super capacitor C1 of the sleep-mode power unit 112 is charged with current through the diode D2. The super capacitor C1 has a dual structure, such that the super capacitor C1 can be charged after an elapse of a predetermined time, e.g., about 20 seconds. Upon completion of the charging, the diode D2 of the sleep-mode power unit 112 is inversely biased to prevent the charged current from being discharged.

When the sleep-mode power unit 112 provides the charged current in the power cut-off mode, the discharged current is from several μAs to 1 or 2 mA. As a result, a load requiring a driving current of several tens of mAs or more like the latching relay 102 cannot be driven with current of the super capacitor C1. Accordingly, the sleep-mode power unit 112 supplies power to the controller 108, the key input unit 120, the communication unit 122, and the sensor unit 118 which consume a small amount of current. When the electronic product 100 includes a remote control receiver, the sleep-mode power unit 112 may supply power to the remote control receiver.

In the power cut-off mode, the controller 108 is not continuously supplied with power from the sleep-mode power unit 112, but operates alternately in the sleep mode and the wake-up mode. Typically, the controller 108 consumes only several μAs in the sleep mode, but consumes several hundreds of μAs in the wake-up mode. Consequently, even if the power cut-off mode is maintained for a long time, the sleep-mode power unit 112 can maintain power supply to the controller 108.

When the electronic product 100 performs a normal operation, the controller 108 checks a current state of the electronic product 100 through the sensor unit 118. The output O4 of the controller 108 applies a 'low' pulse to a base of the transistor Q7 of the sensor unit 118. At this time, the transistor Q7 of the sensor unit 118 is turned on and supplies power to the sensors S1 and S2. The sensors S1 and S2 sense a current state corresponding to a function of the electronic product 100 and provide the sensed data to analog-to-digital converters AD1 and AD2 of the controller 108. The analog-to-digital converters AD1 and AD2 convert analog signals input from the sensors S1 and S2 into digital signals and provide the digital signals to the controller 108.

For example, if a function of the electronic product 100 is a temperature control function, the sensors S1 and S2 measure a temperature associated with the function of the electronic product 100. Once the sensors S1 and S2 provide the measured temperature to the controller 108, the controller 108 determines whether the measured temperature satisfies a predetermined control condition. Thus, the controller 108 determines whether to drive a heater or a cooler as a load. If the sensors S1 and S2 are transducers, the controller 108 determines whether to drive a compressor as a load. The types of the sensors S1 and S2 and the load would vary with a function of the electronic product 100, and the sensors S1 and S2 and the load can also be controlled by the controller 108.

Once the sensor unit 118 provides the sensed data to the controller 108, the output O4 of the controller 108 outputs a 'high' pulse. The transistor Q7 of the sensor unit 118 is turned off, thereby cutting off power to the sensor unit 118. This is intended to minimize unnecessary current consumption when the electronic product 100 is in the power cut-off mode.

The controller 108 determines whether a predetermined control condition is satisfied by comparing a value measured by the sensor unit 118 with a preset value. If the predetermined control condition is satisfied, the controller 108 operates in the power cut-off mode to reduce power consumed in the electronic product 100. Otherwise, if the predetermined control condition is not satisfied, the controller 108 operates in the power supply mode to continuously drive a load.

The controller 108 compares the value measured by the sensor unit 118 with the preset value, and if the predetermined control condition is not satisfied, the controller 108 operates to continuously drive a load. The preset value may be a value preset by a producer at the time of product release or may be a value arbitrarily set by a user. If the predetermined control condition is not satisfied when the electronic product 100 is in the power cut-off mode, the controller 108 wakes up from the sleep mode and applies a pulse going from a 'high' level to a 'low' level to an output O3. At this time, the latching relay 102 is turned on to supply power into the electronic product 100. Thereafter, the controller 108 applies a 'high' pulse to outputs O5 and O6 to turn on the transistors Q1 and Q2 of the load driver 114. The load driver 114 drives relays K1 and K3 to drive the loads 1 and 2. Due to the transition from the power cut-off mode to the power supply mode, the latching relay power unit 110 and the sleep mode power unit 112 are re-charged.

If the sensors S1 and S2 of the sensor unit 118 are periodically measured and the predetermined control condition is satisfied, the controller 108 applies a 'low' pulse to the outputs O5 and O6. Upon input of the 'low' pulse from the controller 108, the load driver 114 turns off the transistors Q1 and Q2 and drives the relays K1 and K3 to stop operations of the loads 1 and 2.

To operate in the power cut-off mode because the predetermined control condition is satisfied, the controller 108 outputs a pulse going from a 'high' level to a 'low' level to the output O2. When the output pulse is 'high', the transistors Q5 and Q6 of the latching relay driving unit 106 are turned on and the current charged in the lathing relay power unit 110 flow in a direction from a terminal 14 to a terminal 15 of a coil stage of the latching relay 102 through the diode D5 and an emitter r of the transistor Q6. As a result, the contact points 10 and 11 and the contact points 12 and 13 of the latching relay 102 are separated from each other, thus cutting off power supply from an external power source. As such, if the predetermined control condition is satisfied, power supply is cut off, thereby reducing standby power consumed in the electronic product 100.

The key input unit 120 includes the resistors R1 and R2 and the switches SW1 and SW2. If the key input unit 120 applies a 'low' pulse to the inputs I1 and I2 of the controller 108, the controller 108 enters an interrupt processing mode, such that the controller 108 wakes up from the sleep mode and performs interrupt processing.

For example, if the electronic product 100 is a refrigerator, a switch of the key input unit 120 may be a door opening sensing switch. If the door of the refrigerator is opened, the switch of the key input unit 120 operates and a 'low' pulse is applied to the inputs I1 and I2 of the controller 108. The controller 108 enters the interrupt processing mode and thus wakes up from the sleep mode, outputting a pulse going from a 'high' level to a 'low' level to the output O3. If the transistors Q3 and Q4 of the latching relay driving unit 106 are turned on when the output O3 of the controller 108 maintains the 'high' pulse, the current charged in the capacitor C2 of the latching relay power unit 110 is provided to the coil stage of the latching relay 102. Upon provisioning of the current to the coil stage of the latching relay 102, the contact points 10 and 11 and the contact points 12 and 13 of the latching relay 102 come into contact with each other, thus supplying the AC power to the power unit 104. The electronic product 100 transits from the power cut-off mode to the power supply mode. In the power supply mode, the controller 108 actuates a lamp as a load to illuminate the inside of the refrigerator. Since the power is supplied again, the latching relay power unit 110 and the sleep-mode power unit 112 are re-charged.

If the electronic product 100 is a bidet, a switch of the key input unit 120 may be a sitting-down sensing switch. If the sitting-down sensing switch senses the sitting-down of a user in the power cut-off mode, an interrupt is generated such that the controller 108 wakes up from the sleep mode to actuate the latching relay 102. As a result, the power is supplied again and the electronic product 100 performs a normal operation. In this way, by interchanging a switch and a load according to a type of the electronic product 100, the present invention can be applied to any type of electronic products.

A description will now be made of an operation for transiting to the power supply mode when an interrupt is generated in the power cut-off mode of the electronic product 100 or the predetermined control condition is not satisfied.

The controller 108 outputs a pulse going from a 'high' level to a 'low' level to the output O3. If the transistors Q3 and Q4 of the latching relay driving unit 106 are turned on when the output O3 of the controller 108 maintains the 'high' pulse, the current charged in the capacitor C2 of the latching relay power unit 110 is provided to the latching relay 102. Once the latching relay power unit 110 provides the current to the coil stage of the latching relay 102 in a direction from the terminal 15 to the terminal 14, the contact points 10 and 11 and the contact points 12 and 13 of the latching relay 102 come into contact with each other, thus supplying the AC power to the power unit 104.

Upon re-supply of the power, the capacitor C2 of the latching relay power unit 110 and the super capacitor C1 of the sleep-mode power unit 112 are re-charged with the current. The controller 108 drives the loads 116 through the load driver 114. If the predetermined control condition is satisfied through driving of the loads 116, the controller 108 performs operations related to the power cut-off mode, thereby minimizing standby power consumed in the electronic product 100.

If the electronic product 100 operating for a long time communicates with a home network system, it may include the communication unit 122 connected with the home network system. In the power cut-off mode, upon input of a control signal from the home network system, the communication unit 122 generates an interrupt. Upon generation of the interrupt in the communication unit 122, the controller 108 performs the above-described operations subsequent to generation of the interrupt to transit to the power supply mode.

Meanwhile, it is general that a load is mounted inside an electronic product to perform an operation for a unique function of the electronic product. However, the load may be an industrial equipment such as a machine tool or a manufacturing facility which may be separately installed outside the electronic product. In this case, the electronic product according to the present invention may be an electronic device for controlling the industrial equipment. The industrial equipment used as the load typically uses 3-phase power.

In the power supply mode, a device for converting the output power of the electronic device to the 3-phase power is required so that the controller of the electronic device can supply power to the load. To this end, a magnet may be provided in the outlet portion 124 of the electronic device. The controller controls an output O7 to actuate the relay K2, thereby supplying or cutting off power to the load. When the power is supplied to the load, the magnet provided in the outlet portion 124 of the electronic device converts 2-phase power into 3-phase power and supplies the 3-phase power to the load. Thus, if a predetermined control condition is satisfied, the electronic device automatically cuts off power supply to the load, thus reducing power consumption.

The structure and operations of the apparatus for reducing power consumption according to an embodiment of the present invention have been described so far. As such, in an electronic product operating for a long time, when a load is not driven because a predetermined control condition is satisfied, power supply is automatically cut off, thereby reducing unnecessary power consumption.

Figure 2:
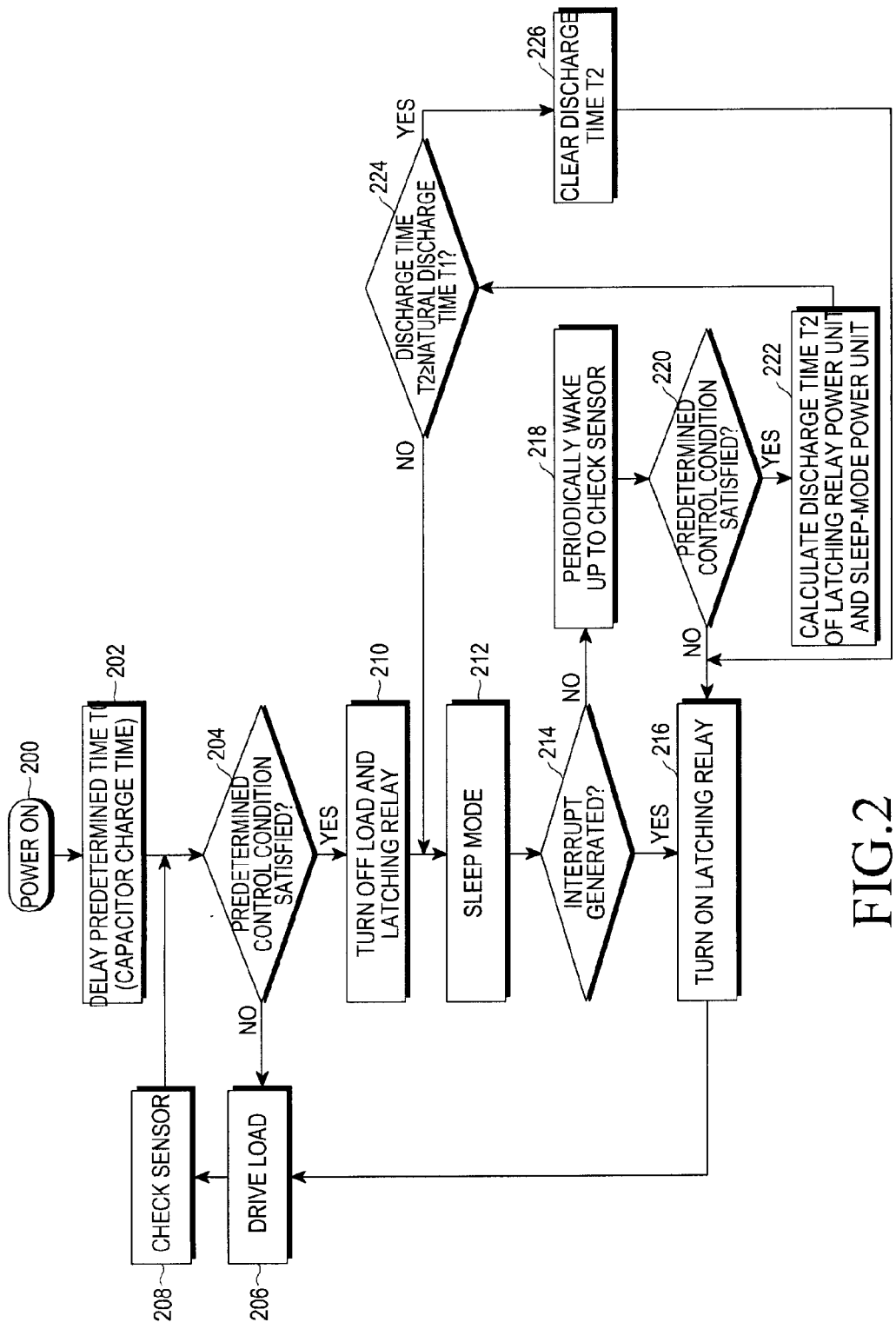
FIG. 2 is a flowchart of a method for reducing power consumption of an electronic product according to an embodiment of the present invention.

FIG. 2 is a flowchart of a method for reducing power consumption of an electronic product according to an embodiment of the present invention.

Referring to FIG. 2, a power switch of the electronic product is turned on. If power supply is abruptly cut off due to a power failure or the like, the latching relay maintains an 'on' state for a predetermined initial time T0 in step 202. This is because if the latching relay is turned off due to the abrupt cut-off of the power supply, the latching relay charger and the sleep-mode charger are not sufficiently charged with current.

In step 204, the controller determines whether a predetermined control condition corresponding to a function of the electronic product is satisfied. If a value input through the sensor unit does not satisfy the predetermined control condition, the process goes to step 206. In step 206, the controller drives a load through a load driver to satisfy the predetermined control condition. In step 208, the controller periodically actuates sensors of the sensor unit to determine whether the predetermined control condition is satisfied.

If the value input through the sensor unit satisfies the predetermined control condition in step 204, the process goes to step 210. In step 210, the controller stops the operation of the load to reduce power consumed in the electronic product and turns off the latching relay. That is, the electronic product enters the power cut-off mode. In step 212, to minimize power consumed in the electronic product, the controller enters the sleep mode.

In step 214, it is determined whether an interrupt is generated from the key input unit 120 or the communication unit 122. If so, the process goes to step 216 to turn on the latching relay and re-supply the power.

Otherwise, if the interrupt is not generated in step 214, the process goes to step 218. In step 218, the controller periodically wakes up from the sleep mode to check the sensors of the sensor unit in the wake-up mode.

After completion of step 218, the controller determines whether the predetermined control condition corresponding to the function of the electronic product is satisfied in step 220. If the value input through the sensor unit does not satisfy the predetermined control condition, the process goes to step 216. In step 216, the controller turns on the latching relay to satisfy the predetermined control condition. Once the latching relay is turned on and thus the power is supplied again, the load is driven by the load driver.

If the value input through the sensor unit satisfies the predetermined control condition in step 220, the process goes to step 222. In step 222, the controller calculates a discharge time T2 of the latching relay power unit and the sleep-mode power unit. This is because if the electronic product satisfies the predetermined control condition for a long time, the current charged in the latching relay power unit and the sleep-mode power unit may be exhausted and thus the operation of the electronic product may not be controlled.

In step 224, the discharge time T2 calculated by the controller is compared with a preset natural discharge time T1. If the discharge time T2 is greater than or equal to the natural discharge time T1, the process goes to step 226 to clear the discharge time T2 and then goes to step 216. In step 216, the latching relay is turned on to supply the power again, and the latching relay power unit and the sleep mode power unit are re-charged with current.

If the discharge time T2 is smaller than the natural discharge time T1, the electronic product continues operating in the power cut-off mode.

In this way, in the electronic product operating for a long time, when a load is not driven because a predetermined control condition is satisfied, power supply is automatically cut off, thereby efficiently reducing unnecessary power consumption.

In the present invention operating as described above, effects obtained by representative ones of the invention disclosed herein will be described briefly as below.

By providing the apparatus and method for reducing power consumption of an electronic product, the present invention automatically cuts off power supply when a load is not driven because the electronic product satisfies a predetermined control condition, reducing unnecessary power consumption.

Meanwhile, while the invention has been shown and described with reference to a certain exemplary embodiment thereof, it will be understood by those skilled in the art that various changes in form and details may be made therein without departing from the spirit and scope of the invention. Therefore, the spirit and scope of the present invention must be defined not by the described embodiment thereof but by the appended claims and equivalents of the appended claims.

What is claimed is:

1. An apparatus for reducing power consumed in an electronic product operating for a long time, the apparatus comprising:

a power switching unit for supplying or cutting off external power to the electronic product;

a sensor unit for measuring a state associated with an operation of a load of the electronic product and outputting measured data; and a controller for determining whether the electronic product satisfies a predetermined control condition for a predetermined duration by using the measured data output from the sensor unit and controlling the power switching unit and the load of the electronic product according to the determination result, wherein if the electronic product satisfies the predetermined control condition for the predetermined duration, the controller stops the operation of the load and turns off the power switching unit to cut off the external power to the electronic product, and if the electronic product does not satisfy the predetermined control condition, the controller turns on the power switching unit to supply the external power and drives the load again, wherein, the electronic product includes the power switching unit, the load, the sensor unit, and the controller, in which the load is a device or a part of the electronic product that exhibit a unique function of the electronic product, and wherein, if the predetermined control condition is satisfied, the apparatus calculates a discharge time of a charged current and compares the calculated discharge time with a natural discharge time of the charged current, if the calculated discharge time is greater than or equal to the natural discharge time, the electronic product operates in a power supply mode, and if the calculated discharge time is less than the natural discharge time, the electronic product operates in a power cut-off mode.

2. The apparatus of claim 1, further comprising a signal generator for outputting a signal for transiting the electronic product to a power supply mode to the controller if an interrupt is generated by a user or a home network communication when the electronic product is in a power cut-off mode.

3. The apparatus of claim 2, further comprising:
a power switching power unit for supplying power for driving the power switching unit; and
a sleep-mode power unit for supplying power to the controller, the sensor unit, and the signal generator,
wherein the power switching power unit and the sleep-mode power unit are supplied with power when the electronic product is in the power cut-off mode, and are re-charged when the electronic product is in the power supply mode.

4. The apparatus of claim 1, wherein the controller operates alternately in a sleep mode and a wake-up mode in a periodic manner.

5. The apparatus of claim 2, wherein the controller operates alternately in a sleep mode and a wake-up mode in a periodic manner.

6. The apparatus of claim 3, wherein the controller operates alternately in a sleep mode and a wake-up mode in a periodic manner.

\* \* \* \* \*